(12) United States Patent
Yamamoto et al.

(10) Patent No.: US 8,855,950 B2
(45) Date of Patent: Oct. 7, 2014

(54) INTERPROCESSOR COMMUNICATION MEASUREMENT SYSTEM

(71) Applicant: Fujitsu Limited, Kawasaki (JP)

(72) Inventors: Takashi Yamamoto, Kawasaki (JP); Toshikazu Ueki, Yokohama (JP); Kenta Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/763,813

(22) Filed: Feb. 11, 2013

(65) Prior Publication Data

US 2013/0151173 A1 Jun. 13, 2013

Related U.S. Application Data

(63) Continuation of application No. PCT/JP2010/064300, filed on Aug. 24, 2010.

(51) Int. Cl.
*G01R 15/00* (2006.01)
*G06F 15/167* (2006.01)
*G06F 11/30* (2006.01)
*G06F 11/34* (2006.01)
*H04L 12/26* (2006.01)

(52) U.S. Cl.
CPC .............. *G06F 11/34* (2013.01); *G06F 15/167* (2013.01); *G06F 11/3096* (2013.01); *H04L 43/18* (2013.01); *G06F 11/3006* (2013.01); *G06F 11/349* (2013.01)
USPC .............................. 702/57; 702/127; 702/189

(58) Field of Classification Search
CPC ... G06F 11/3006; G06F 11/349; G06F 11/34; G06F 15/167; G06F 11/3096; H04L 43/18

USPC ............................................ 702/127, 189, 57
See application file for complete search history.

(56) References Cited

FOREIGN PATENT DOCUMENTS

| JP | H4-70579 A | 3/1992 |
|---|---|---|
| JP | 9-26942 A | 1/1997 |
| JP | H9-26942 A | 1/1997 |
| JP | 2006-107071 A | 11/1998 |
| JP | H10-313330 A | 11/1998 |
| JP | H11-175366 A | 7/1999 |
| JP | 2001-229080 A | 8/2001 |

OTHER PUBLICATIONS

Asaka, Machiko; Takeuchi Shigeo; Toba Tatsu, Jan. 28, 1997, English (machine) translation of JP H9-26942A.*

(Continued)

*Primary Examiner* — Mischita Henson
(74) *Attorney, Agent, or Firm* — Fujitsu Patent Center (57) ABSTRACT

An interprocessor communication measurement system for an information processing apparatus having a plurality of processors which may send data to the other processors through a plurality of communication channels, includes a socket which is connected with communication channels and electrically connects a processor attached thereto with the communication channels, a measurement node which is attached to the socket in place of the processor and electrically connected with the communication channels, wherein the measurement node includes a routing unit configured to send data destined for any one of the other processors to the one of the other processors through the communication channels and an intercepting unit configured to intercept data sent through the routing unit, and a storing unit configured to store data intercepted by the intercepting unit of the measurement node.

2 Claims, 11 Drawing Sheets (56) References Cited

OTHER PUBLICATIONS

Chiba Takahiro, Jul. 2, 1999, English (machine) translation of JP H11-175366A.*

International Search Report, mailed in connection with PCT/JP2010/064300 and mailed Nov. 30, 2010.

Notification of Transmittal of Translation of the International Preliminary Report on Patentability (Form PCT/IB/338), 8 pages, dated Mar. 28, 2013.

Japanese Office Action mailed Nov. 5, 2013 for corresponding Japanese Application No. 2012-530464, with Partial English-language Translation.

* cited by examiner

| SETTING TARGET \ DESTINATION | TO CPU0 | TO CPU1 | TO CPU2 | TO CPU3 |
|---|---|---|---|---|
| CPU0 | | PORT0 | PORT2 | PORT1 |
| CPU1 | PORT2 | | PORT1 | PORT0 |
| CPU2 | PORT0 | PORT1 | | PORT2 |
| CPU3 | PORT1 | PORT2 | PORT0 | |

FIG. 3

| SETTING TARGET | TO NODE0 | TO CPU1 | TO CPU2 | TO CPU3 |
|---|---|---|---|---|
| NODE0 | | PORT0 | PORT2 | PORT1 |
| CPU1 | PORT2 | | PORT2 | PORT2 |
| CPU2 | PORT0 | PORT0 | | PORT0 |
| CPU3 | PORT1 | PORT1 | PORT1 | |

INTERPROCESSOR COMMUNICATION MEASUREMENT SYSTEM

CROSS-REFERENCE TO RELATED APPLICATION

This application is a continuation application of International Application PCT/JP2010/064300 filed an Aug. 24, 2010, the entire contents of which are incorporated herein by reference.

FIELD

The embodiments described herein relate to a measurement system for interprocessor communication in an information processing apparatus.

BACKGROUND

One of architectures of computer systems (information processing apparatuses) is that plural CPUs (Central Processing Unit) are mutually communicatively connected through buses. For example, such architecture is employed in a shared memory system, in which each CPU is connected with a memory and each memory is shared with the CPUs.
[Patent Document 1]
Japanese Laid-Open Patent Publication No. 2001-229080
[Patent Document 2]
Japanese Laid-open Patent Publication No. H10-313330
[Patent Document 3]
Japanese Laid-Open Patent Publication No. 2006-107071

SUMMARY

Figure 10:
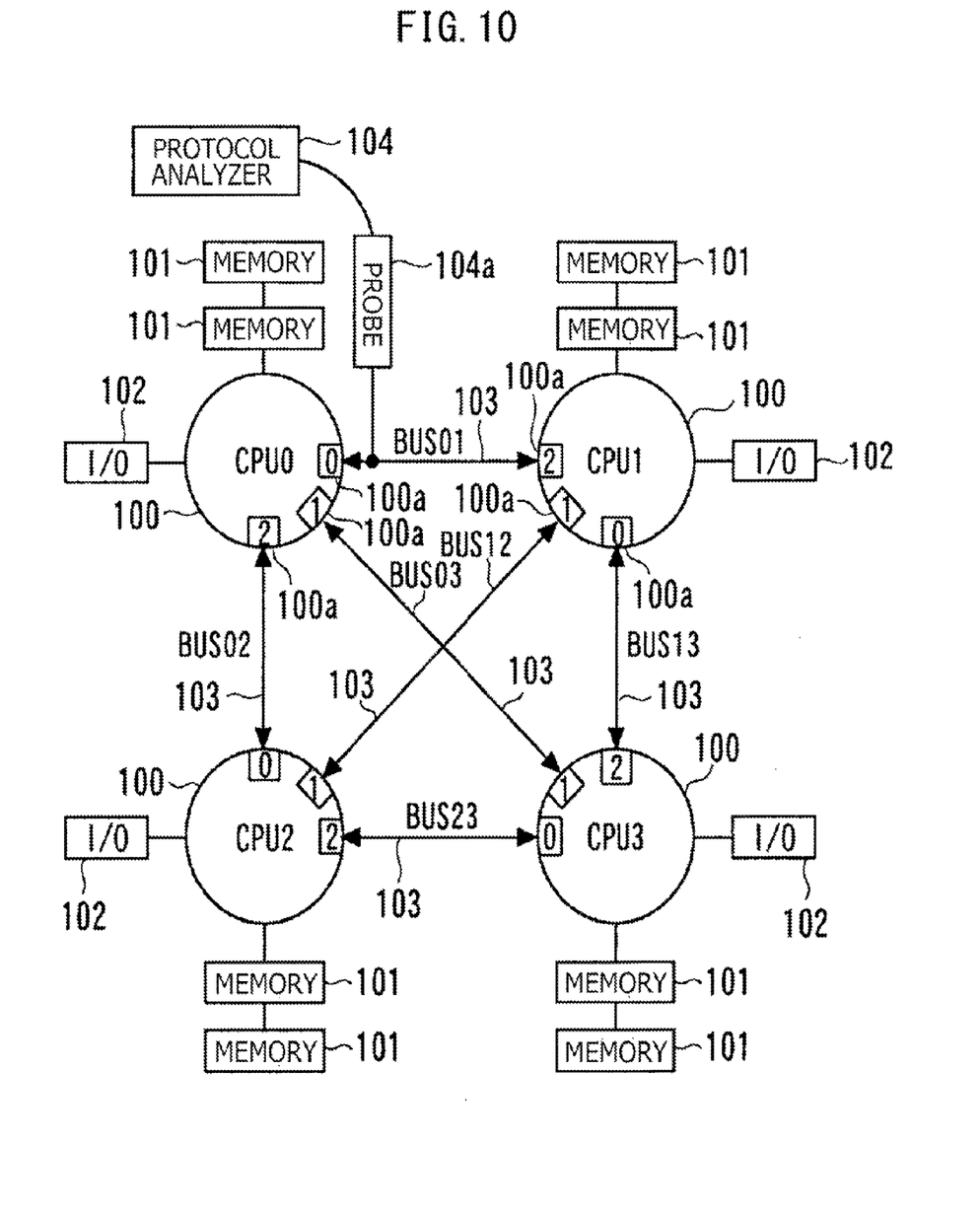
FIG. 10 is a block diagram illustrating a conventional measurement method applied to an information processing apparatus.

FIG. 10 is a block diagram illustrating a schematic structure of such a shared memory system. In the example illustrated in FIG. 10, a shared memory system includes plural memories 101 and four CPUs (CPU0 to CPU3) 100 each of which is connected with an input/output circuit (I/O) 102. Further, each CPU (CPU0 to CPU3) 100 includes three ports (port0 to port2) 100a, and each port (port0 to port2) 100a is connected with one of three buses 103 which are individually connected with one of the other three CPUs (CPU0 to CPU3) 100. For example, port0 of CPU0 is connected with bus (BUS01) 103 which is connected with CPU1, port1 thereof is connected with bus (BUS03) 103 which is connected with CPU3, and port2 thereof is connected with bus (BUS02) 103 which is connected with CPU2.

In the above computer system, it is desirable that the transaction conditions (usage conditions) between CPUs 100 may be measured. In that case, a measurer uses a protocol analyzer 104 employed for the sole purpose of the measurement, and connects a probe 104a provided as an input device of protocol analyzer 104 with bus 103 to be measured to activate the protocol analyzer 104.

However, for example, in a shared memory system, since each CPU is connected in a one-to-one relationship through bus 103, the number of buses 103 is $_nC_2$ (here, n is the number of CPUs), which means that the larger the number of CPUs 100, the larger the number of buses 103 becomes. Then, due to physical restrictions on the connection of probe 104 and the like, it is difficult to measure the transaction conditions of plural buses 103 simultaneously, and therefore in a single measurement only one bus 103 may be subject to the measurement. Thus, in conventional measurement methods each bus 103 is measured sequentially to complete the measurement of the transaction conditions of buses 103 included in the computer system.

Figure 11:
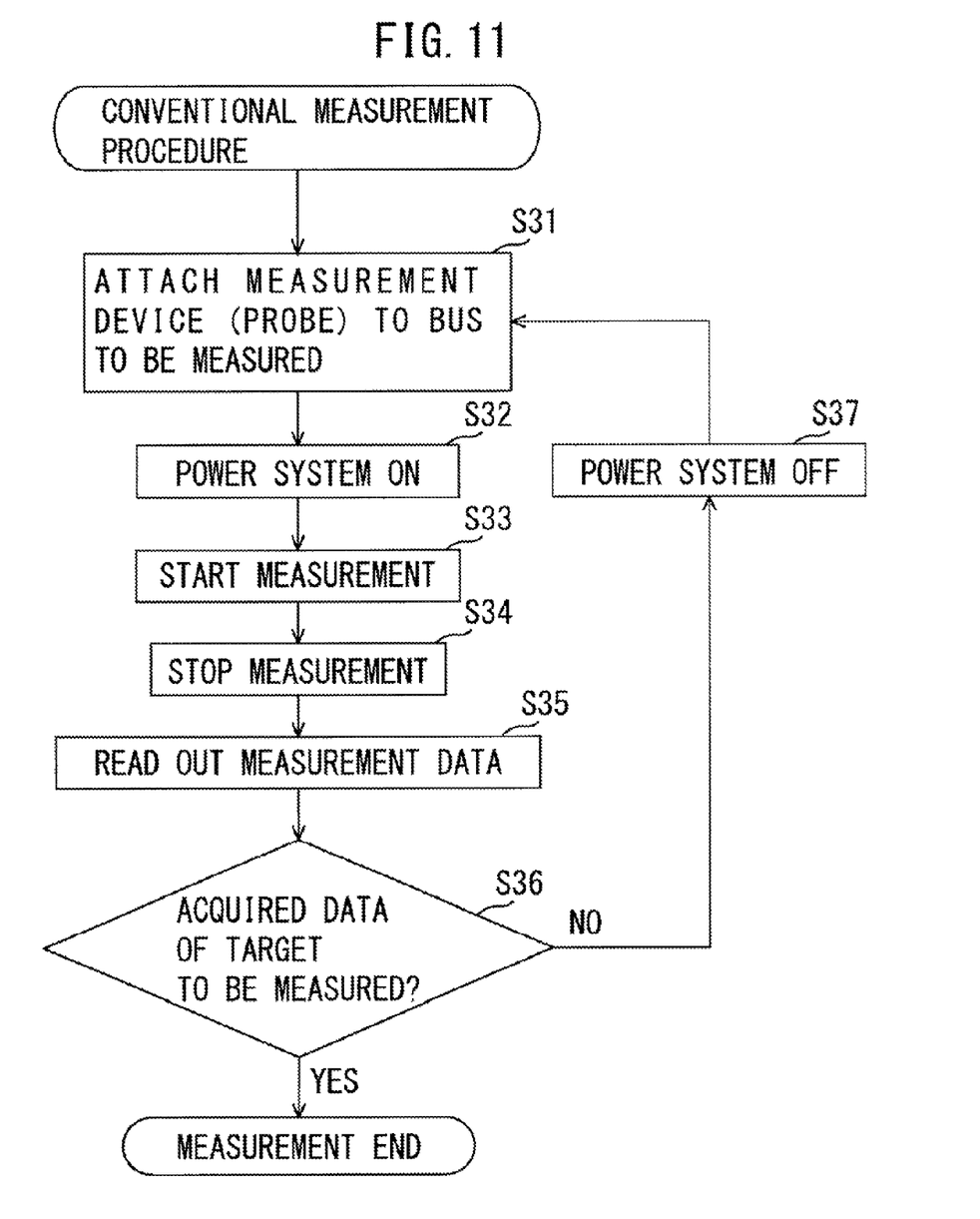
FIG. 11 is a flowchart illustrating procedures followed by a measurer to carry out the conventional measurement method.

FIG. 11 is a flowchart illustrating a sequence of a conventional measurement. As illustrated in the flowchart in FIG. 11, first a measurer selects one of unselected buses among plural buses 103 in the computer system, and attaches probe 104a of protocol analyzer 104 to the selected bus 103 (S31). Then, the measurer powers the computer system on (S32) and starts the measurement (S33). Completing required measurement processes, the measurer stops the measurement (S34), and then protocol analyzer 104 reads out the measurement data (S35). When the above operations (S31 to S35) have not been carried out to buses 103 yet (S36: NO), the measurer powers the computer system off (S37) and selects one of the other unselected buses and repeats the operations S31 to S35. In contrast, when the operations S31 to S35 have been carried out to buses 103 (S36: YES), the entire measurement complete.

As explained above, in conventional measurement methods, time and effort are taken for setting probe 104a in order to complete the measurement of transaction conditions of buses 103 in a computer system.

An information processing apparatus to which an interprocessor communication measurement system is applied according to an aspect of the embodiment includes a plurality of processors which may send data to the other processors through a plurality of communication channels. And at least one of the plurality of processors is connected with the plurality of communication channels and attached to a socket which electrically connects the processor with the plurality of communication channels. The interprocessor communication measurement system includes a measurement node which is attached to the socket in place of the processor and electrically connected with the plurality of communication channels. The measurement node includes a routing unit configured to send data destined for any one of the other processors to the one of the other processors through the plurality of communication channels and an intercepting unit configured to intercept data sent through the routing unit. The system further includes a storing unit configured to store data intercepted by the intercepting unit of the measurement node.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Specific embodiments of a measurement system of interprocessor communications in an information processing apparatus will be described hereinafter. Such conventional measurement methods face a problem that is may be difficult to measure the protocol correlations between CPUs. Moreover, a problem also arises that accurate measurements are prevented because for example the inductance of a bus line is changed when a probe comes into contact with the bus line and as a result the electrical properties of the bus lines are varied. With this in mind, it is an object in one aspect of the embodiment to measure the transaction conditions between processors simultaneously by intercepting packets which plural processors included in an information processing apparatus send to each of the other processors. In examples described below, an information processing apparatus is a shared memory system in which plural memories are connected under each CPU (Central Processing Unit) and each memory is shared among the CPUs. However, a measurement system of interprocessor communications according to an aspect of one of the embodiments may be employed in any information processing apparatus which includes plural CPUs and performs packet (alternatively, frame or cell) communications between each CPU.

Figure 1:
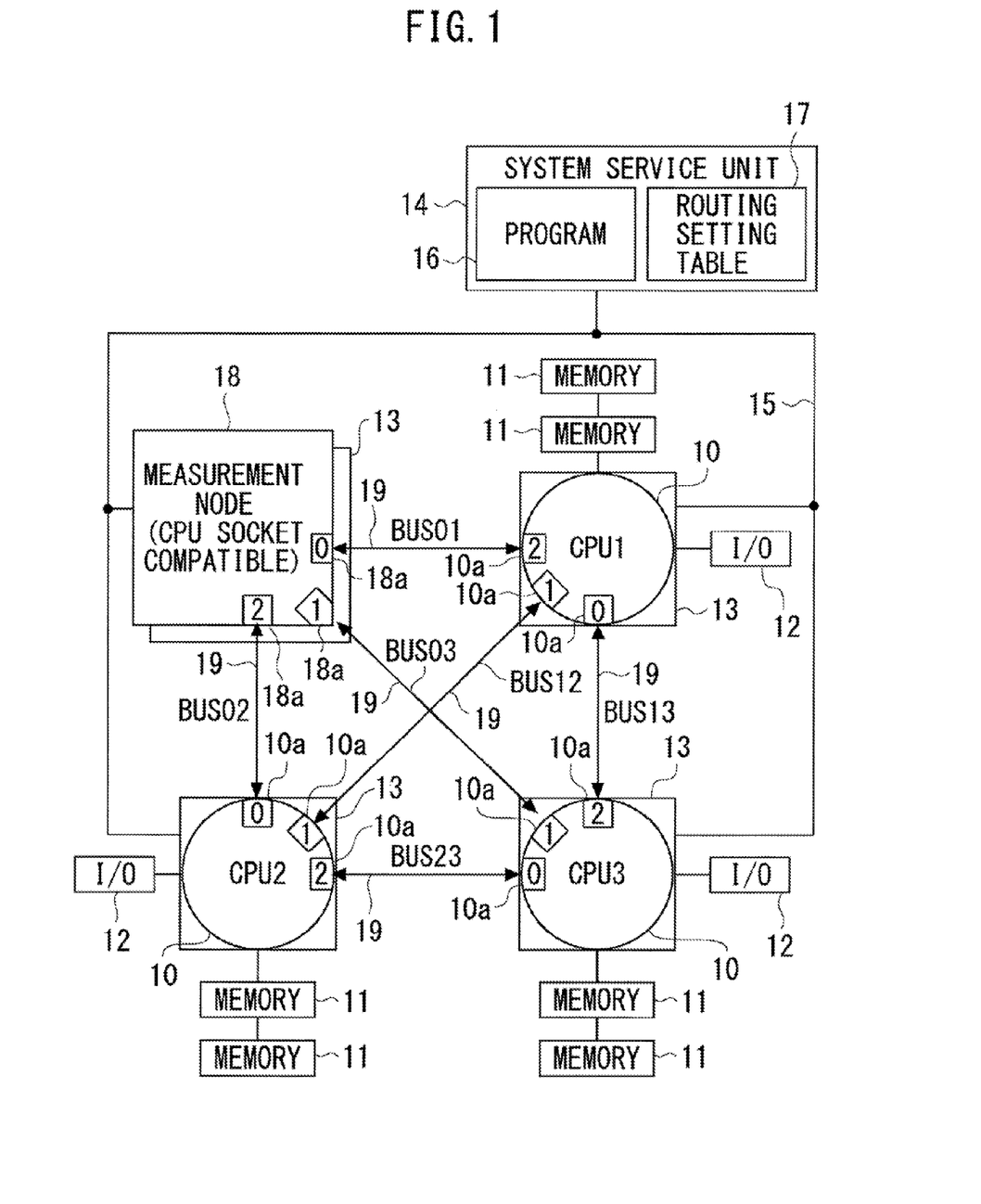
FIG. 1 is a block diagram illustrating a schematic structure of a shared memory system.

FIG. 1 is a schematic structural diagram illustrating a shared memory system which includes a measurement system of interprocessor communications. The shared memory system illustrated in FIG. 1 may include four CPUs (CPU0 to CPU3) 10 each of which is connected with plural memories 11 and an input/output unit (I/O) 12 thereunder. However, CPU 0 is not illustrated in FIG. 1 for the reasons as described below. Each CPU (CPU0 to CPU3) 10 is attachable to and detachable from a socket 13 on the substrate. Each CPU (CPU0 to CPU3) 10 includes plural ports (port0 to port2) 10a for sending and receiving packets.

Figure 2:
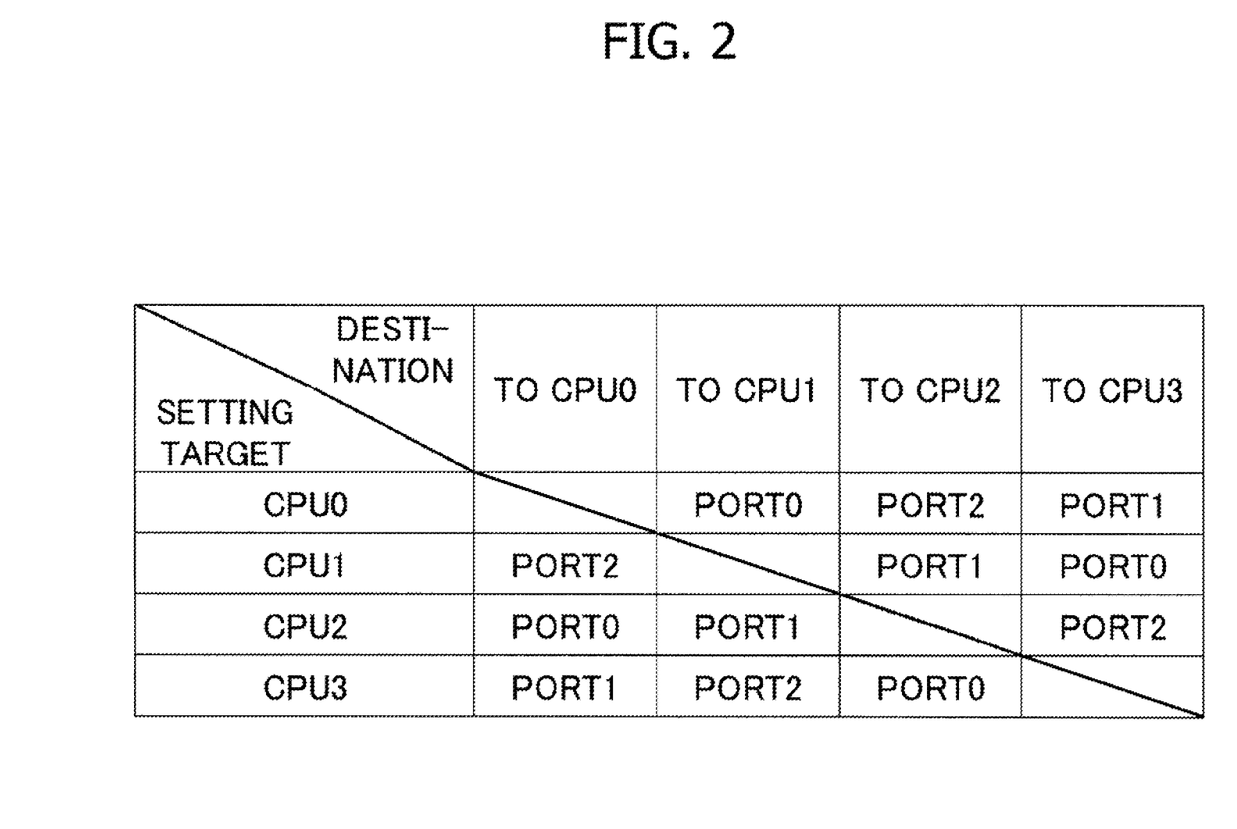
FIG. 2 is a table illustrating an example of data contained in a routing setting table for normal mode.
Figure 3:
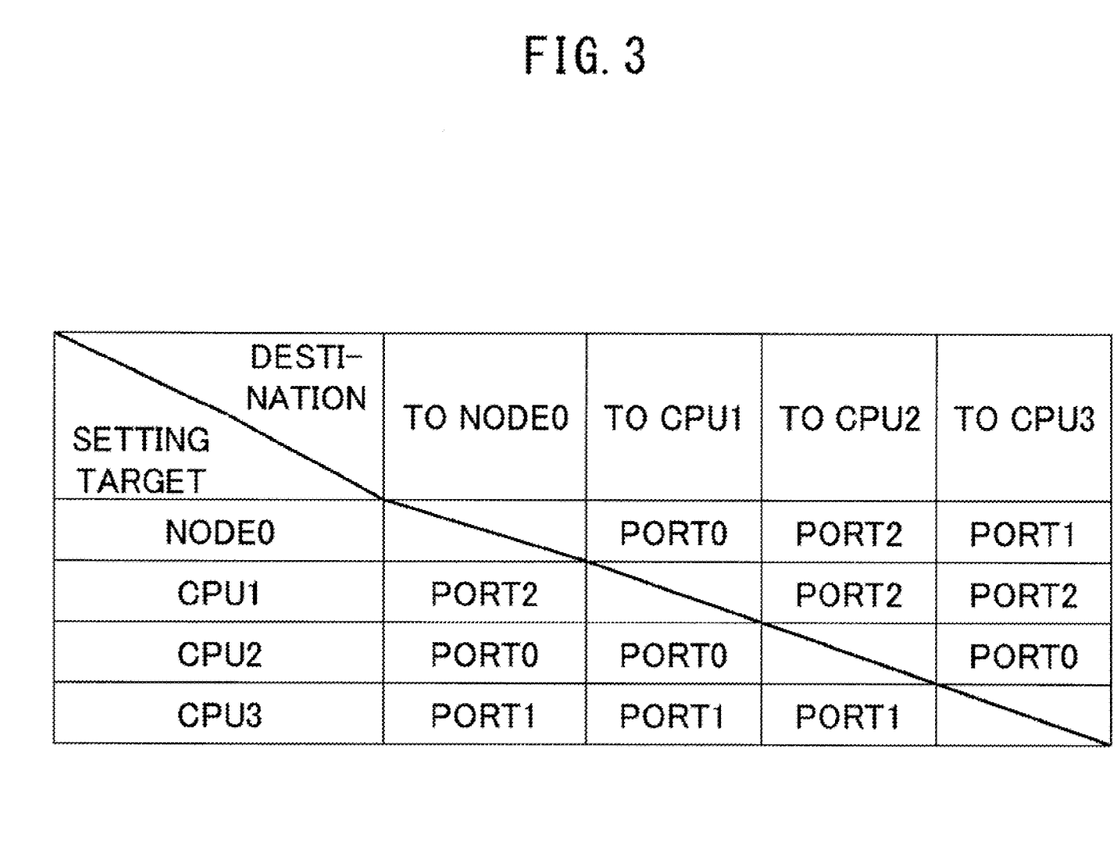
FIG. 3 is a table illustrating an example of data contained in a routing setting table for measurement mode.

Each socket 13 is connected with a control signal line 15 which is connected with a system service unit 14 in order that CPU 10 is electrically connected with a control interface (not illustrated) for CPU 10 when CPU 10 is attached to socket 13. System service unit 14 is a processor executing service processes such as routing settings of each CPU 10 and a measurement node 18 as described below and measurement instructions of transactions to measurement node 18 as described below. System service unit 14 includes an internal memory 16 which stores a program for executing routing settings and measurement instructions as mentioned above and an internal memory 17 which stores a number of routing setting tables defining the contents of routing. Routing here is switching packet receiving ports including output ports according to the destinations of packets which are received through corresponding ports 10a from other CPUs 10 or are generated by a processing circuit (a circuit itself for processing data according to a program) in its own CPU 10. Specifically, when the destination of a packet is its own CPU 10 the packet is taken in a processing circuit 20 (see FIG. 1) in its own CPU 10, and when the destination is any one of the other CPUs the packet is sent through port 10a corresponding to the destination. Although the details are described below, a routing setting table is a table which defines, for each CPU 10 and measurement node 18, from which port (port0 to port2) 10a a packet destined for any one of the other CPUs 10 or measurement node 18 is sent. FIG. 2 illustrates a routing setting table for normal mode, in which each CPU 10 is connected with each socket 13 respectively. Further, FIG. 3 illustrates a routing setting table for measurement mode, in which measurement node 18 is attached to a socket instead of CPU0.

Figure 4:
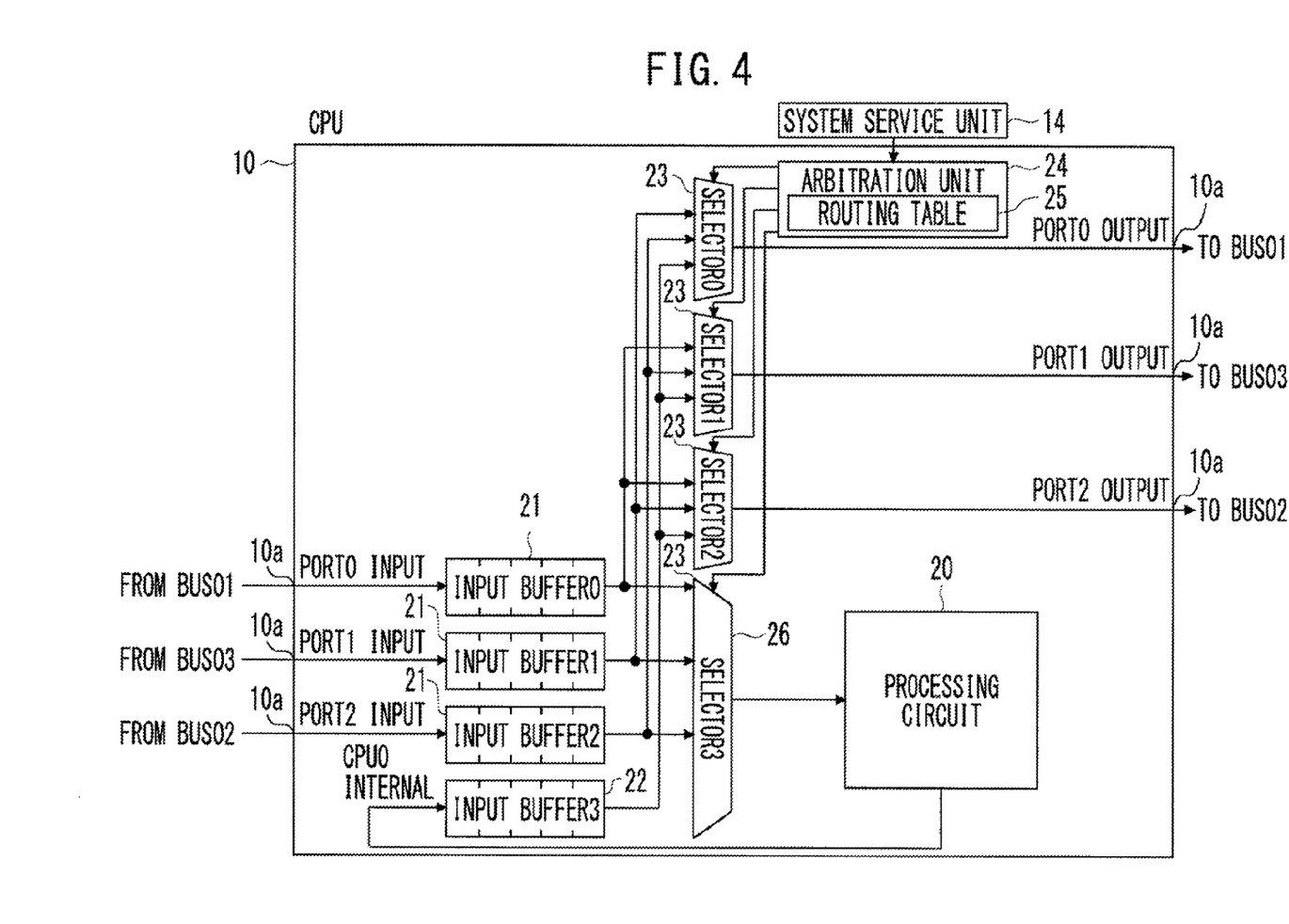
FIG. 4 is a block diagram illustrating a part of an internal structure of a CPU which involves in routing.

FIG. 4 is a block diagram illustrating a circuit structure of a part involving in routing in each CPU 10 (an example of a routing unit). As illustrated in FIG. 4, CPU 10 includes three input buffers 21 temporarily storing packets received through each port (port0 to port2) 10a and an input buffer 22 temporarily storing packets destined for any one of the other CPUs generated by processing circuit 20 in the CPU. The output terminal of each input buffer 21, 22 is connected with the input terminals of four selectors (selector0 to selector3) 23, 26. The output terminals of three selectors (selector0 to selector2) 23 are connected with their corresponding ports (port0 to port2) 10a, and the output terminal of selector 26 is connected with processing circuit 20 in CPU 10. Each selector (selector0 to selector3) 23, 26 receives inputs of selection signals from an arbitration unit 24. A selection signal is a signal for making each selector 23, 26 select one of the input terminals and send from the output terminal packets which are input from input buffer 21 connected with the selected input terminal.

Arbitration unit 24 includes a routing table 25 which defines the port number of port 10a for each packet destination in order to output packets (when the destination is its own CPU the port number is a NULLL value). Arbitration unit 24 reads out from routing table 25 a port number or a NULLL value corresponding to the destination of a packet input into each selector 23. Then, arbitration unit 24 outputs a selection signal to each selector 23, 26 which makes selector 23 connected with port 10a corresponding to the read port number or selector 26 connected with processing circuit 20 corresponding to the read NULLL value send the packet.

Routing table 25 in arbitration unit 24 in each CPU 10 is rewritten under the control of system service unit 14. Specifically, in normal mode, system service unit 14 reads out for each CPU 10 from the routing setting table for normal mode (FIG. 2) in internal memory 17 a row in which the name of the CPU is described in the "setting target" section. Then, system service unit 14 sets routing table 25 to make each CPU 10 send a packet destined for each CPU described in the "destination" section in the read row to the port described in the column corresponding to the destination CPU in the read row. Here, in FIG. 2, each diagonal line in the four grids means that the value in the corresponding "destination" section is a NULLL value.

As a result of the above settings, for example, in CPU0, packets destined for CPU0 are retrieved by processing circuit 20 of CPU0, packets destined for CPU1 are sent from port0, packets destined for CPU2 are sent from port2, and packets destined for CPU3 are sent from port1. Further, in CPU1, packets destined for CPU0 are sent from port2, packets destined for CPU1 are retrieved by processing circuit 20 of CPU1, packets destined for CPU2 are sent from port1, and packets destined for CPU3 are sent from port0.

In addition, each socket 13 is connected with three buses 19 corresponding to each port of CPU 10 so that each socket 13 is electrically connected with each port 10a of CPU 10 when CPU 10 is attached to socket 13. Each bus 19 is connected with any port 10a of any one of the other CPUs 10 through any one of the other sockets 13. That is, each bus as a communication route individually connects the plural CPUs (processors) 10 each other. For example, bus (BUS01) 19 electrically connected with port0 of CPU0, which is not illustrated, is connected with port2 of CPU1, bus (BUS03) 19 electrically connected with port1 of CPU0 is connected with port1 of CPU3, and bus (BUS02) 19 electrically connected with port2 of CPU0 is connected with port0 of CPU2. Further, bus (BUS13) 19 electrically connected with port0 of CPU1 is connected with port2 of CPU3, and bus (BUS12) 19 electrically connected with port1 of CPU1 is connected with port1 of CPU2. Moreover, bus (BUS23) 19 electrically connected with port2 of CPU2 is connected with port0 of CPU3. As a result, each packet destined for any one of the other CPUs 10 sent from each CPU 10 reaches the destination CPU 10.

Figure 5:
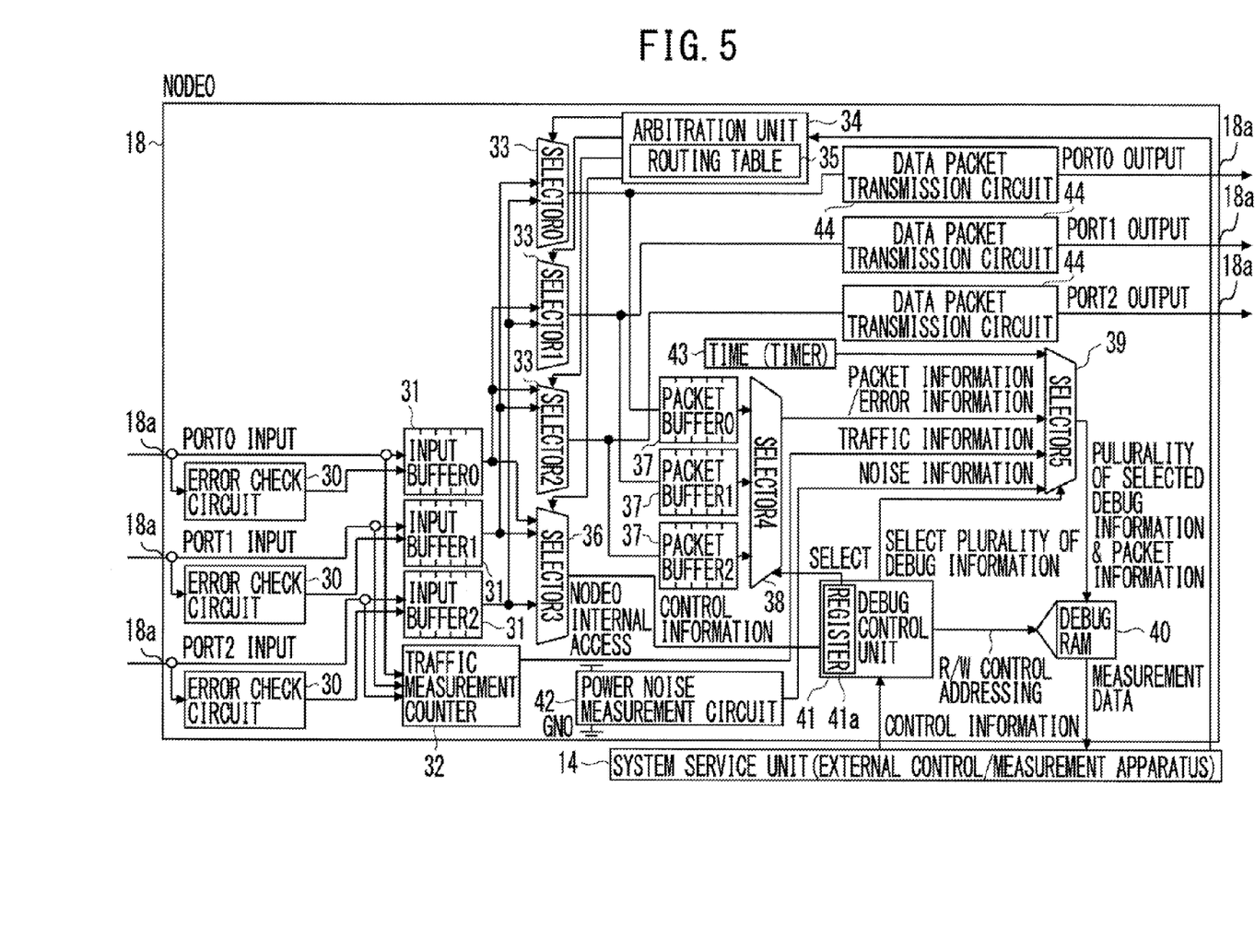
FIG. 5 is a block diagram illustrating an internal structure of a measurement node.

In the shared memory system structured as described above, when transactions are measured between three of four CPUs (CPU0 to CPU3) 10 and the other CPU 10, a measurer detaches one CPU 10 from socket 13 and attaches measurement node 18 to socket 13 instead. FIG. 5 is a block diagram illustrating a circuit structure implemented in measurement node 18. Measurement node 18 is a kind of processor compatible with CPU 10 and includes pins which are the same as CPU 10, three ports (port0 to port2) 18a, and circuits 33 to 36 (corresponding to circuits 23 to 26 in FIG. 4) for routing. Further, measurement node 18 has functions for intercepting routed packets, for checking and correcting errors of packets (ECC [Error Check and Correct] function), for measuring the traffic of each bus 19 connected with socket 13, and for measuring the amount of power noise. The content of an intercepted packet is referred to as "packet information" hereinafter. In addition, error information which is the check result of the ECC function, traffic information, and the measurement result of the amount of power noise are generically referred to as "debug information." Measurement node 18 has functions for storing packet information and debug information and for providing the stored packet information and debug information in response to requests from system service unit 14.

In FIG. 5, measurement node 18 includes an error check circuit 30 for each port 18a which generates error information by checking and correcting errors based on the ECC function for packets received through each port (port0 to port2) 18a. Here, the error information includes the differentiation between correctable error and uncorrectable error which are detected as a result of the error check, and bit information of a correctable error which has been corrected. A packet received through each port (port0 to port2) 18a and error information generated for the packet by each error check circuit 30 are buffered simultaneously to the same block in input buffer (input buffer0 to input buffer2) 31 provided for each port 18a.

The output terminal of each input buffer (input buffer0 to input buffer2) 31 is connected with the input terminals of four selectors (selector0 to selector3) 33, 36. Three selectors (selector0 to selector2) 33 of the four selectors are connected with a corresponding port (port0 to port2) 18a respectively, and the output terminal of selector 36 is connected with debug control unit 41. Each selector (selector0 to selector3) 33, 36 receives selection signals from arbitration unit 34. A selection signal is a signal for making each selector 33, 36 select one of the input terminals and send packets and error information from the output terminal which are input from input buffer 31 connected with the selected input terminal.

Arbitration unit 34 includes routing table 35 which defines, for each packet destination, the port numbers for packets to be output (a NULLL value when a packet is output to its own measurement node or CPU which is replaced with its own measurement node). Arbitration unit 34 reads out from routing table 35 a port number or a NULLL value which corresponds to the destination of packet information input into each selector 33. Then, arbitration unit 34 outputs a selection signal so that packet information and error information are output from selector (selector0 to selector2) 33 connected with port 18a corresponding to the read port number or from selector 36 connected with debug control unit 41 corresponding to the read NULL value.

Each input buffer 31, each selector 33 and arbitration unit 34 as described above are an example of a routing unit. Data packet transmission circuit 44 which is interposed between each selector (selector0 to selector2) 33 and the corresponding port 18a is a circuit for preventing error information from passing to each port 18a and allowing only packets to pass to each port 16a.

Routing table 35 in arbitration unit 34 in measurement node 18 is configured under the control of system service unit 14. Specifically, system service unit 14 includes four different routing setting tables for measurement mode in internal memory 17 which correspond to CPUs (CPU0 to CPU3) 10 respectively. FIG. 3 illustrates one of the routing setting tables for measurement mode which is used for performing measurement when CPU0 is replaced with measurement node 18 ("node0" in FIG. 3). As illustrated in FIG. 3, a routing table for measurement mode differs from that for normal mode in that as for each CPU, ports 10a connected with measurement node 18 are defined as ports 10a for outputting packets destined for any one of the other CPUs 10. Further, the routing table for measurement mode has a feature that port 18a connected with CPU 10, which is the original destination, is defined as port 18a for measurement node 18 to output packets destined for any one of the other CPUs 10.

When CPU0 is replaced with measurement node 18 to perform the measurement, system service unit 14 reads out from the routing setting table for measurement mode illustrated in FIG. 3 a row in which "measurement node 0" is designated in the "setting target" section. Then, system service unit 14 sets routing table 35 so that a packet destined for each CPU 10 designated in the "destination" section in the read row is sent to a port designated in the column corresponding to the destination CPU 10 in the row. At this time, system service unit 14 also rewrites routing tables 25 in arbitration units 24 in the other CPUs (CPU1 to CPU3) 10. System service unit 14 performing the process is an example of a routing table changing unit. Specifically, system service unit 14 reads out, for each CPU (CPU1 to CPU3) 10, from the routing setting table for measurement mode a row in which the name of the corresponding CPU 10 is designated in the "setting target" section. Then, system service unit 14 rewrites routing tables 25 so that a packet destined for each CPU described in the "destination" section in the read row is sent to a port described in the column corresponding to the destination CPU in the row. In addition, "CPU0" is not set as a destination in the routing setting table illustrated in FIG. 3 because system service unit 14 prevents processing circuits 20 in the other CPUs (CPU1 to CPU3) 10 from sending packets destined for the CPU (CPU0) which is replaced with measurement node 18.

As s result, packets destined for the other CPUs 10 and measurement node 18 from each CPU (CPU1 to CPU3) 10 are sent to measurement node 18 from the ports (port2 in CPU1, port0 in CPU2, and port1 in CPU3) which are connected with measurement node 18. Then, each packet sent to measurement node 18 is transferred, through measurement node 18, to the destination CPU 10 from the ports (port0 in CPU1, port2 in CPU2, and port1 in CPU3) 18a connected with CPU 10, which is the original destination. Therefore, packets destined for CPU1 are sent to CPU1 from port0 of measurement node 18, packets destined for CPU2 are sent to CPU2 from port2 of measurement node 18, and packets destined for CPU3 are sent to CPU3 from port1 of measurement node 18. Further, packets destined for measurement node 18 are input into debug control unit 41. As described above, packets destined for the other CPUs 10 from CPUs (CPU1 to CPU3) 10 are routed to the original destination through measurement node 18. Thus, packets sent to any one of the other CPUs 10 from each CPU 10 are intercepted by measurement node 18. In addition, the rewrite processes of each routing table 25, 35 may be executed by a BIOS program run in an internal processing circuit (not illustrated) in measurement node 18.

In order to intercept packets sent through measurement node 18 as described above, signal lines connecting the output terminal of each selector (selector0 to selector2) 33 with the corresponding port 18a are branched to connect with the corresponding packet buffers (packet buffer0 to packet buffer2) 37. Therefore, packets and error information which are output from the output terminals of selectors (selector0 to selector2) 33 are buffered by packet buffers (packet buffer0 to packet buffer2) 37, which are connected with the ends of the branched signal lines connected with the output terminals. And the output terminal of each packet buffer (packet buffer0 to packet buffer2) 37 is connected with the input terminal of selector 38. Selector 38 sequentially selects an input terminal based on selection signals sent from debug control unit 41, reads out, on each selection, packets and error information from packet buffer (packet buffer0 to packet buffer2) 37 connected with the selected input terminal, and outputs the packets and error information from the output terminal. Each buffer 37, selector 38 and debug control unit 41, which are the branch destination of the output terminal of each selector (selector0 to selector2) 33, are an example of an intercepting unit.

The data amount of packets input from each port 18a into the corresponding input buffer 31, that is, the traffic of each bus 19 connected with each port 18a through socket 13 is measured by a traffic measurement counter 32. Traffic measurement counter 32 outputs the traffic information representing the traffic of each bus 19 from the output terminal.

In addition, measurement node 18 includes a power noise measurement circuit 42 for measuring the power voltage and outputting the noise amount (power noise) as noise information which exceeds a predetermined voltage threshold. Further, the voltage threshold is set by system service unit 14.

Moreover, measurement node 18 includes a timer circuit 43 for sequentially outputting time information.

The output terminal of selector 38, the output terminal of traffic measurement counter 32, the output terminal of power noise measurement circuit 42, and the output terminal of timer circuit 43 as described above are connected with the respective input terminals of selector 39. Selector 39 sequentially selects the input terminals according to selection signals sent from debug control unit 41 and outputs, on each selection, the information input into the selected input terminal from the output terminal. That is, selector 39 outputs packets and error information sent from selector 38 which is selected according to the selection signal, traffic information sent from traffic measurement counter 32, or noise information sent from power noise measurement circuit 42 and time information sent from timer circuit 43.

Debug control unit 41 includes a register 41a in which output patterns of selection signals are defined for selector 38 and selector 39. And when packets destined for measurement node 18 received from the other CPUs contain control information or when debug control unit 41 receives control information from system service unit 14, debug control unit 41 rewrites the settings in register 41a according to the received control information. For example, register 41 maybe set so that packets are sequentially read from packet buffers (packet buffer0 to packet buffer2) 37 or packets are read only from a particular packet buffer 37. Then, debug control unit 41 supplies selection signals having the contents corresponding to the settings of register 41a to selector 38 and selector 39.

Figure 6:
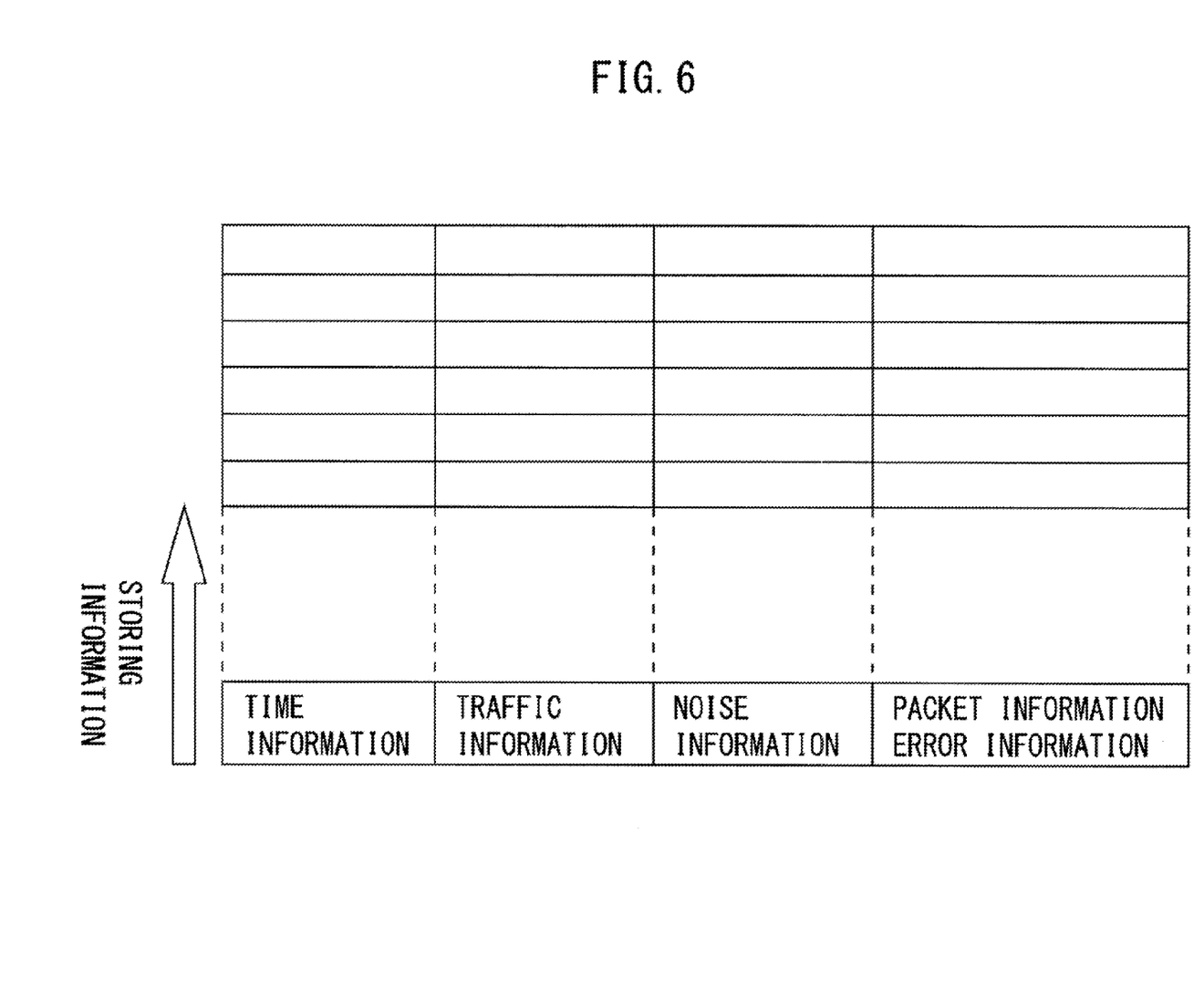
FIG. 6 is a table illustrating a data format of data stored in a debug RAM.

Debug RAM 40, which is connected with the output terminal of selector 39, stores according to the control of debug control unit 41 time information, traffic information, noise information, and packets (packet information) and error information which are input from selector 39. That is, each time debug control unit 41 controls selector 39 to output time information, debug control unit 41 generates in debug RAM 40 a record in which the time information is written, and then makes packet information and error information, traffic information, and noise information which have been output until the time information is output next time be written into the same record. As a result, as illustrated in FIG. 6, packet information and error information, traffic information, and noise information which are input from a fifth selector 39 within the time window indicated by the time information are recorded in each record in debug RAM 40. Debug RAM 40 is an example of a storing unit. And system service unit 14 reads out the information stored in debug RAM 40. Since debug information is stored in debug RAM 40 in addition to packet information as described above, the analyses of interprocessor communications using debug information and error information may be achieved.

Next, processes which system service unit 14 executes according to programs read out from internal memory 16 in order to measure the transactions between processors will be described with reference to the flowchart illustrated in FIG. 7. In advance of execution of the processes illustrated in FIG. 7, a measurer gives control information to debug control unit 41 of measurement node 18 through any one of sockets 13 and system service unit 14 or any one of the other CPUs 10, and performs settings of register 41a of measurement node 18. And the measurer selects three CPUs 10 which are subject to the measurement, attaches measurement node 18 to socket 13 in place of the remaining CPU 10 with the shared memory system powered off, and then powers the shared memory system on. Then, system service unit 14 starts the processes illustrated in FIG. 7 by detecting that one of CPUs 10 is replaced with measurement node 18.

After starting the processes, in the first step S01 system service unit 14 reads out from internal memory 17 a routing setting table for measurement mode (see FIG. 3) corresponding to CPU 10 which is replaced with measurement node 18. Then, system service unit 14 makes arbitration unit 34 of measurement node 18 set the contents of routing table 35 based on the contents of the rows in which "node0" is set in the "measurement target" section in the routing setting table. Similarly system service unit 14 mates arbitration unit 24 of each CPU 10 which is described in the "measurement target" section in the routing setting table rewrite the contents of the routing table 25 based on the contents of the rows in which the name of each CPU is described. As a result, each arbitration unit 24, 34 autonomously performs routing of packets received from each port 10a, 18a according to the settings in each routing table 25, 35.

In the next step S02, system service unit 14 makes debug control unit 41 of measurement node 18 start performing the measurement according to the settings in register 41*a* (namely, switching of each selector 38, 39) and storing information in debug RAM 40.

System service unit 14 waits for time used for storing enough amount of information in debug RAM 40 and proceeds to S03. In S03, system service unit 14 mates debug control unit 41 of measurement node 18 stop the measurement which has been started in S02.

In the next step S04, system service unit 14 reads out the stored information from debug RAM 40 of measurement node 18.

In the next step S05, system service unit 14 reads out a routing table for normal mode from internal memory 17. System service unit 14 makes arbitration unit 24 of each CPU 10 which is described in the "measurement target" section in the read routing table for normal mode rewrite the content of each routing table 35 based on the content of the row in which the name of CPU is described. The process restores routing table 35 of arbitration unit 34 of CPUs 10 other than CPU 10 which is replaced with measurement node 18 to the state before the measurement.

In the next step 6, system service unit 14 performs an protocol analysis, an error analysis and the like based on the information read out from debug RAM 40 of measurement node 18. Once the process in S06 is completed, system service unit 14 terminates the processes illustrated in FIG. 7. In addition, the measurer then powers the shared memory system off, detaches measurement node 18 from socket 13, and attaches originally disposed CPU 10 to socket 13. Since routing table 25 in arbitration unit 24 in CPU 10 attached to socket 13 has not been rewritten in S01, when the shared memory system is powered on next time the original routing is restarted.

In the above described embodiment, measurement node 18 may capture packets which CPUs 10 other than the CPU replaced with measurement node 18 among plural CPUs 10 which are included in the shared memory system send to any one of the other CPUs 10. However, measurement node 18 does not intercept packets sent from CPU 10 replaced with measurement node 18 to any one of the other CPUs 10. Further, measurement node 18 does not directly measure the traffic of buses 19 other than bus 19 connected directly with socket 13 to which measurement node 16 is attached and the amount of noise of the power supply of the socket. Thus, measurement omissions may be complemented by, as illustrated in FIGS. 8A to 8D, sequentially changing sockets 13 to which measurement node 18 is attached and performing the measurement as described above each time measurement node 18 is relocated. In the example illustrated in FIGS. 8A to 8D, first (A) CPU0 is replaced with measurement node 18 and the measurement is performed, next (B) CPU1 is replaced with measurement node 18 and the measurement is performed, and then (C) CPU2 is replaced with measurement node 18 and the measurement is performed, finally (D) CPU3 is replaced with measurement node 18 and the measurement is performed. The flowchart in FIG. 9 illustrates the processes of system service unit 14 which are executed by a program in which the processes illustrated in FIG. 7 are modified in order to facilitate the measurer to perform the above measurement.

Figure 9:
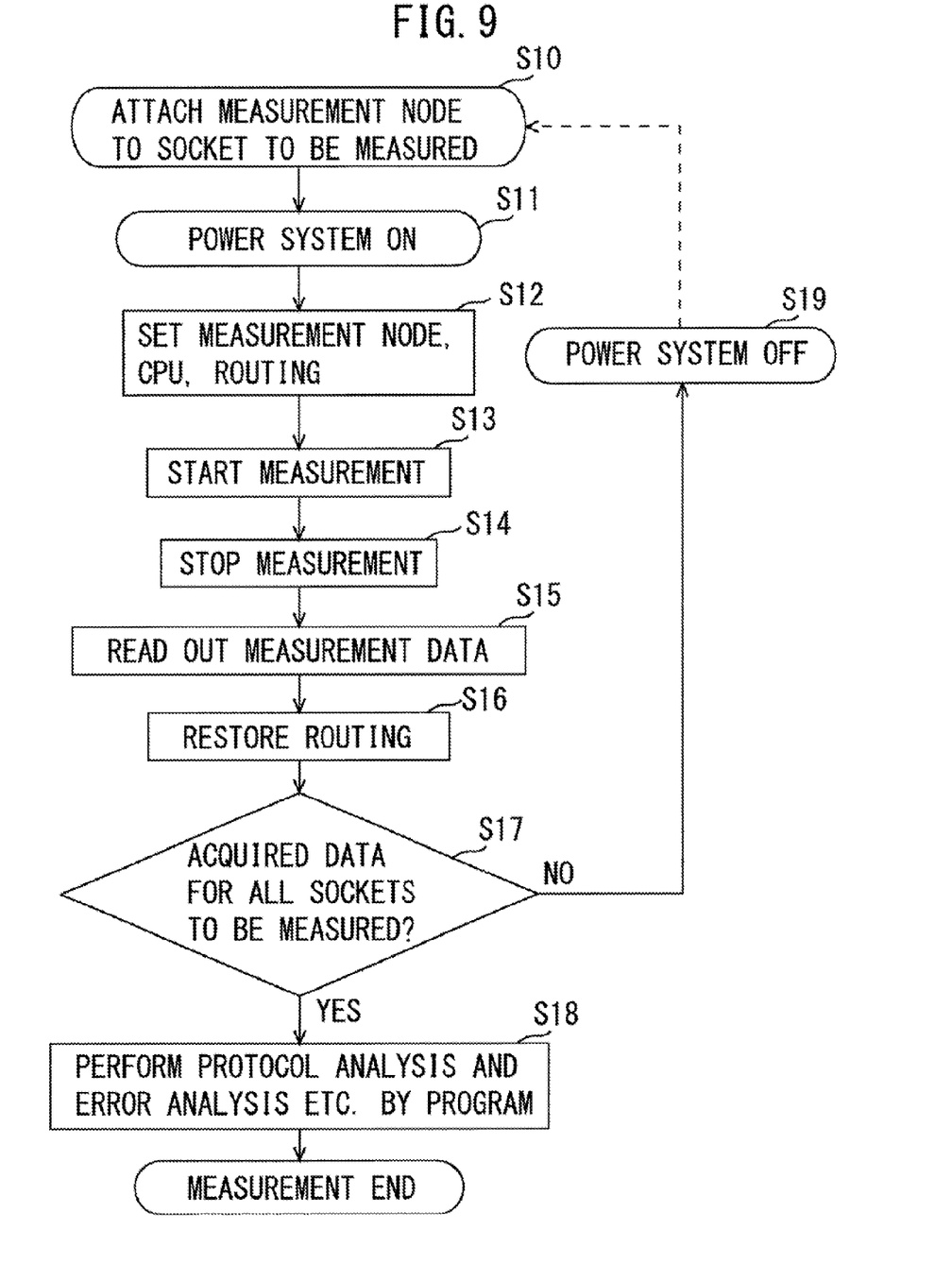
FIG. 9 is a flowchart illustrating measurement processes executed by the system service unit in order to achieve the application of the measurement.

In advance of execution of the processes illustrated in FIG. 9, while the shared memory system is powered off, the measurer selects one of the unselected sockets 13 to which the measurer attaches measurement node 18 and performs the measurement, detaches CPU 10 from the selected socket 13, and attaches measurement node 18 to the selected socket 13 (S10). And then, the measurer powers the shared memory system on (S11). As a result, system service unit 14 detects that one CPU 10 is replaced with measurement node 18 and starts the processes in S12 and the following steps.

Figure 7:
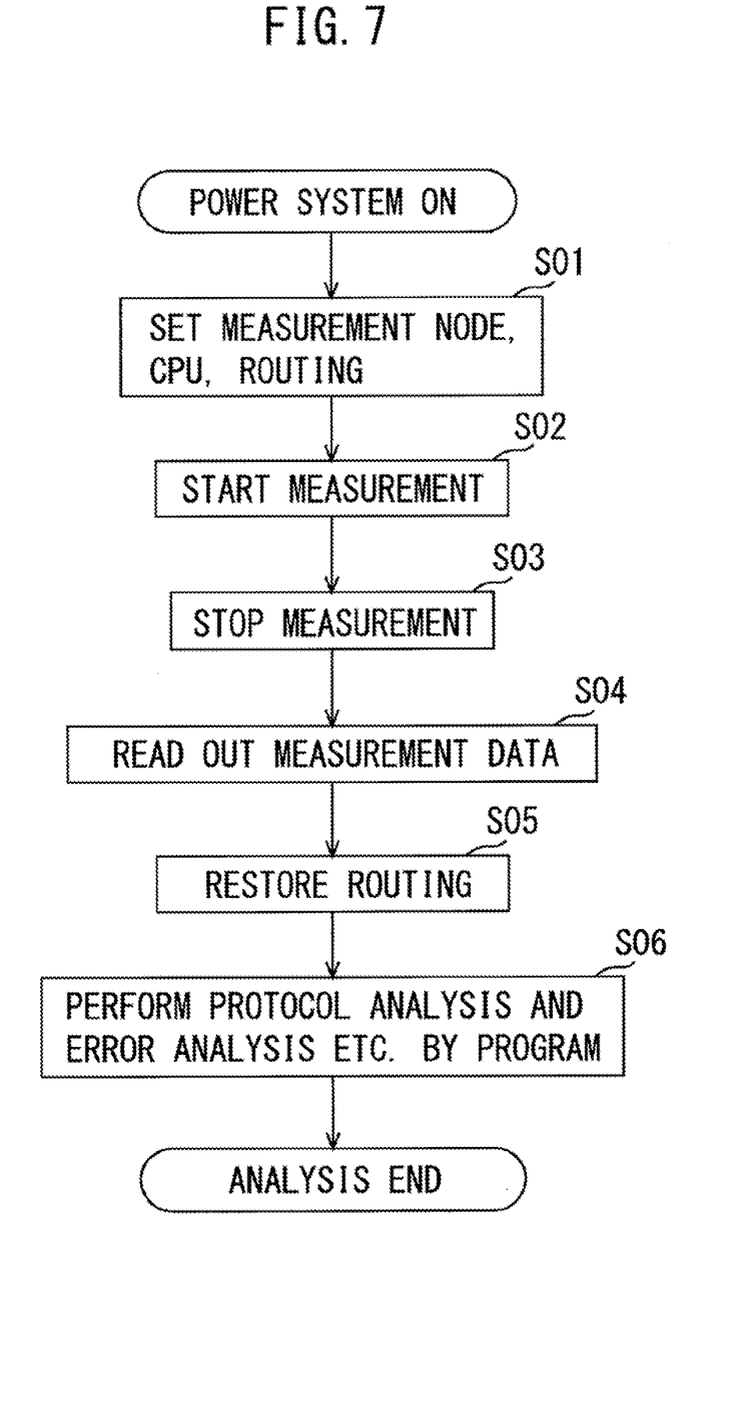
FIG. 7 is a flowchart illustrating measurement processes executed by a system service unit.
Figure 8A:
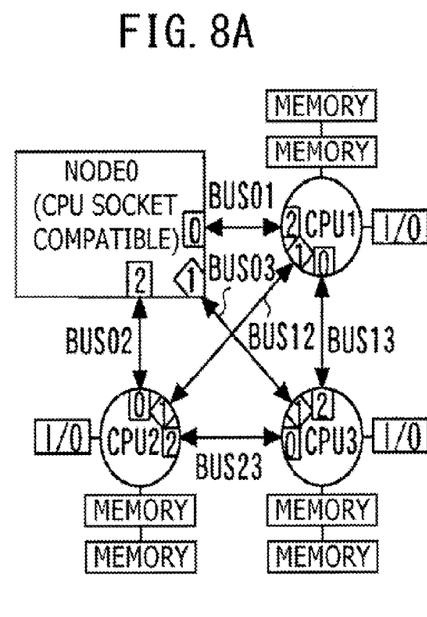
FIGS. 8A to 8D are transition diagrams illustrating an application example of a measurement of a shared memory system.
Figure 8B:
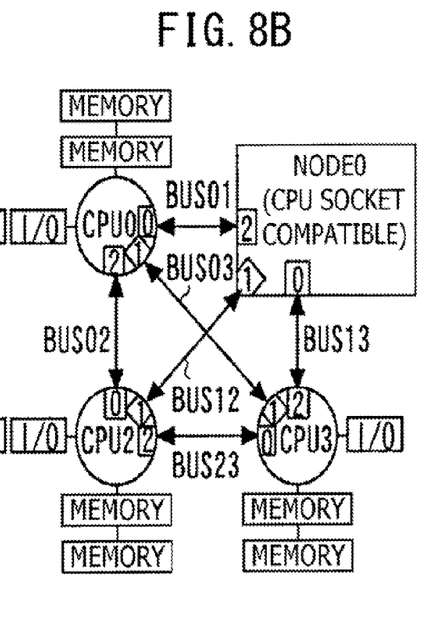
Figure 8C:
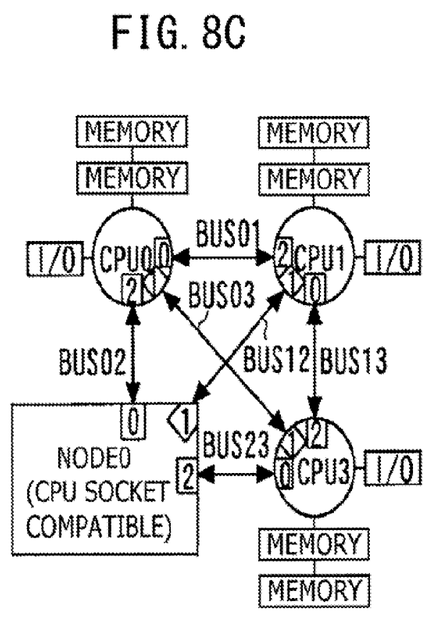
Figure 8D:
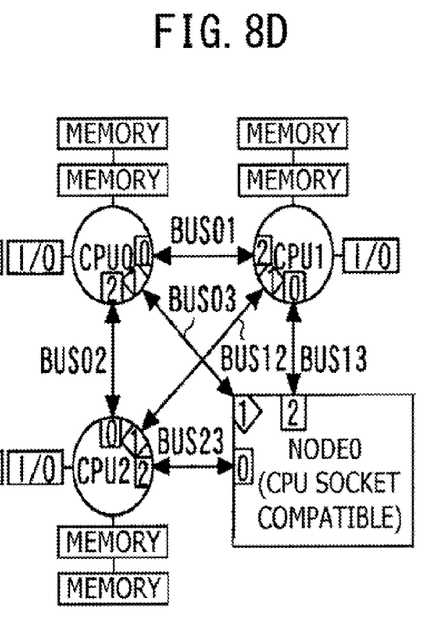

Since the processes from S12 through S16 are the same as those from S12 through S16 illustrated in FIG. 7, the detail explanations for the processes are omitted here.

In S17 following S16, system service unit 14 checks whether or not the measurement is performed with measurement node 18 attached and data is acquired for the sockets. System service unit 14 may perform the check in S17 based on preset information. Also system service unit 14 may record the socket to which measurement node 18 is attached for the measurement and perform the check in S17 based on the record. Then, when the measurement with measurement node 18 attached is not completed for sockets 13, system service unit 14 powers the shared memory system off in S19. After the shared memory system is powered off, the measurer detaches measurement node 18 from socket 13 and attaches to socket 13 CPU 10 which is originally attached to socket 13. Then, the measurer selects one of the unselected sockets 13 and replaces CPU 10 which is disposed on the selected socket 13 with measurement node 18 (S10) and powers the shared memory system on (S11).

As a result of repeating the above procedure, when it is determined in S17 that the measurement with measurement node 18 attached is performed for the sockets, system service unit 14 proceeds from S17 to S18. Since the process in S18 is the same as in S06, the explanation for the process is omitted here. After the process in S06 is completed, system service unit 14 terminates the processes performed by the program.

According to the embodiments as described above, packets which are sent from CPUs 10 other than the one CPU 10 which is replaced with measurement node 18 among plural CPUs 10 included in the shared memory system are routed through measurement node 18. Packets routed to measurement node 18 as described above are intercepted by measurement node 18 and the packet information is stored along with debug information in debug RAM 40. In addition, since CPU 10 is replaced with measurement node 18 using an existing socket 13 provided originally for disposing CPU 10 onto the substrate, no electrically influence is made on each bus 19. Therefore, in the embodiments packets sent from plural CPUs 10 may be intercepted simultaneously and traffic measurement may be simultaneously performed to plural buses 19 connected with socket 13 as described above. Thus, in comparison with conventional measurement methods, the trouble of powering the system power supply on and/or off and sequentially connecting a probe with each bus 19 may be avoided. Consequently, advantages are obtained such that many steps may be saved for the measurement, and the protocol correlations between CPUs 10 may be measured.

All examples and conditional language recited herein are intended for pedagogical purposes to aid the reader in understanding the invention and the concepts contributed by the inventor to furthering the art, and are to be construed as being without limitations to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An interprocessor communication measurement system for an information processing apparatus having a plurality of processors each of which may send data to other processors through a plurality of communication channels, the interprocessor communication measurement system comprising:
- a socket which is connected with the plurality of communication channels and electrically connects a processor of the plurality of processors attached thereto with the plurality of communication channels;
- a measurement node which is attached to the socket in place of the processor and electrically connected with the plurality of communication channels, wherein the measurement node includes a routing unit configured to send data destined for any one of the other processors to the one of the other processors through the plurality of communication channels and an intercepting unit configured to intercept data sent through the routing unit; and
- a storing unit configured to store data intercepted by the intercepting unit of the measurement node,
- wherein the plurality of communication channels individually connect the plurality of processors to each other, and each processor includes:
- a plurality of ports individually connected with the plurality of communication channels;
- a routing table configured to define a relation between a destination processor of data and a port from which the data is sent;
- a routing unit configured to refer to the routing table to determine a port to send data destined for any one of the other processors and send the data destined for any one of the other processors from the determined port; and
- a routing table changing unit configured to rewrite the routing table of each processor as another routing table in which a port connected with one of the plurality of communication channels connecting with the measurement node is defined as a port to send data destined for any one of the other processors.

2. The interprocessor communication measurement system according to claim 1, wherein:
- the measurement node further comprises a measuring unit configured to measure a state of each communication channel connected with the socket; and
- the storing unit also stores information about the state of each communication channel measured by the measuring unit.

\* \* \* \* \*